(12) United States Patent
Jeong

(10) Patent No.: US 6,819,664 B1
(45) Date of Patent: Nov. 16, 2004

(54) VOICE COMMUNICATION SYSTEM

(75) Inventor: Man Su Jeong, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/496,957

(22) Filed: Feb. 3, 2000

(30) Foreign Application Priority Data

Feb. 5, 1999 (KR) .......................................... 1999-3964

(51) Int. Cl.$^7$ ........................... H04L 12/28; H04L 12/66
(52) U.S. Cl. ........................ 370/352; 370/401; 370/466; 379/88.17
(58) Field of Search ................................ 370/338, 352, 370/359, 389, 395.1, 395.5, 395.52, 395.6, 395.61, 401, 465, 466, 467, 522, 525, 526; 379/88.16, 88.17, 88.22, 88.23, 88.24, 93.01, 93.26, 219, 220, 229, 235, 360, 361, 418; 709/230, 249, 250

(56) References Cited

U.S. PATENT DOCUMENTS

| | | | | |
|---|---|---|---|---|
| 4,912,701 A | * | 3/1990 | Nicholas | 370/60 |
| 5,790,548 A | * | 8/1998 | Sistanizadeh et al. | 370/401 |
| 5,859,848 A | * | 1/1999 | Miura et al. | 370/395 |
| 5,940,479 A | * | 8/1999 | Guy et al. | 379/93.01 |
| 6,160,874 A | * | 12/2000 | Dickerman et al. | 379/114 |
| 6,215,783 B1 | * | 4/2001 | Neyman | 370/353 |
| 6,233,234 B1 | * | 5/2001 | Curry et al. | 370/356 |
| 6,259,691 B1 | * | 7/2001 | Naudus | 370/352 |
| 6,304,566 B1 | * | 10/2001 | Schessel | 370/354 |

* cited by examiner

Primary Examiner—Alpus H. Hsu
(74) Attorney, Agent, or Firm—Fleshner & Kim, LLP

(57) ABSTRACT

A voice communication apparatus that includes gateway modules in a distributed structure to drive a protocol selected by a corresponding terminal in communication with a public telephone network, so as to convert a packet and renew a state variation of a terminal allocated to itself within a group while performing the packet conversion, and a packet switching module to switch to a corresponding port while communicating between a public telephone network and the gateway module or between a LAN and the gateway module. Each module thus co-owns the information by transferring the call signal and voice by the ethernet interface on a network standard, and accordingly, the switching between the PSTN (public switched telephone network) gateway modules is simply performed. This facilitates long-distance communication with an employee, for example, who may telecommute from a remote place, thereby reducing the expense of long-distance communication. The user can be directly connected to the LAN-based voice terminal through the multi-media switch module, or indirectly connected to the LAN-based voice terminal through the general hub or the switch hub allowing for expansion of the capacity.

23 Claims, 6 Drawing Sheets

VOICE COMMUNICATION SYSTEM

BACKGROUND OF THE INVENTION

1. Field of the Invention

The present invention relates to a switching system, and more particularly, to a voice communication apparatus in a private multi-media system.

2. Background of the Related Art

Currently, most office environments use a private switching system PBX or a key phone system for telephone communication and network equipment for data communication.

FIG. 1 shows a related art local area network (LAN). As shown in FIG. 1, the LAN includes a plurality of hubs 102 and 103, connected in parallel to a router 101, that is in turn connected to a dedicated network and/or the Internet. A plurality of terminals 104~105 and 106~107 are respectively connected in parallel to each of the hubs 102 and 103.

A private telephone network, on the other hand, includes a plurality of telephone sets 112~114, respectively connected in parallel to a private switching system or a key phone system 111 that is connected to a public telephone network.

Accordingly, in the related art, when using the LAN for data communication, each hub 102 and 103 switches data receiving and transferring paths for the terminals 104~105 and 106~107. The router 101 provides the data receiving and transferring path for the hub, through which data communication is made for each terminal 104~107 via the dedicated network and/or the Internet.

When using a private telephone network for voice communication, the private switching system or the key phone system 111 switches a communication path of the plurality of telephone sets 112~114, enabling the plurality of telephone sets 112~114 to be connected to a third party through the public telephone network.

As described above, the related art has various problems. For example, since a LAN cable and a telephone cable are separately wired, the private switching system or the key phone system and a data communication network equipment, which should preferably be provided altogether, require dual communication lines, for example, to a desk of a user. This increases the expense and time taken for cabling.

Second, since a business firm typically uses its own mode for the private switching system, it can have difficulty in adding further capacity to a system, moving into a new office, or changing information with such a classical system establishing and operating method. Also, management expenses are dually incurred because of the separate operation between the voice and the data system.

Third, since the related art private switching system uses a circuit switching method in which specific communication channels are allocated for a voice of each of a telephone service company line and an interphone line and information between the channels is transferred and switched to the other party through a memory buffer, the capacity and the speed for switching is limited, and a high level data link control method is weak for the speed in switching signal information besides the voice information.

Moreover, the voice channel and the signal channel are formed duplex, making the structure of the system and its software complicated.

The switching method of the private switching system according to the related art additionally has problems with expandibility, and since it is a voice-oriented switching system, has structural difficulty in operating along with a multi-media communication on a data communication.

Furthermore, based on the related art, where a company has many branch offices, in order to reduce expenses for toll line calls and international telephone calls between each of the branch offices, the company usually leases an exclusive line from a communication company and bears the monthly fixed charges. Moreover, communication rate on the leased-line for the voice communication is mostly maintained idle, except for a busy time during working hours.

Next, to access the Internet, a long-distance network, such as a wide area network (WAN) is typically constructed between the branch offices, and a connection line path to an Internet service provider (ISP) is built in only one office, for which that office bears the monthly fixed charges for the Internet connection expense.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a communication apparatus that substantially obviates one or more of the problems caused by disadvantages in the related art.

Another object of the present invention is to provide a communication apparatus that is capable of mutually communicating on voice by adopting a private multi-media system having a structure that supports interphone line switching and its connection to a telephone service company line on an ethernet LAN line implemented by the IEEE 802.3, for which the voice communication is routed by a WAN to the Internet to reduce communication expenses.

Another object of the present invention is to provide a communication apparatus that is capable of transmitting voice and data over a LAN.

To achieve these objects and other advantages in whole or in parts, and in accordance with the purpose of the present invention, as embodied and broadly described herein, there is provided a voice communication apparatus adopting a private multi-media system connecting a telephone service company line and a LAN, which includes an N number of gateway modules for communicating with a public telephone network; a N/M number of packet switching modules for communicating between a public telephone network and the N number of gateway modules or between the LAN and the N number of gateway modules; and an ethernet interface block on an IEEE 802.3 for commonly connecting an N number of ports (PORT1~PORTN) defining four ethernet transfer lines (Tx+, Tx−, Rx+ and Rx−) as one port both to the gateway modules and the packet switching modules.

The private multi-media system adopts an ethernet link implemented by the IEEE 802.3 for communication between internal modules, by which the system itself has a distributed structure that minimizes the LAN network of an office, so that its function can be readily improved according to a later additional module implementation, if any.

The private multi-media system includes a standardized single LAN network structure that supports an internal and external voice communication, a switch structure for multi-media that facilitates an expandibility and includes a voice on a real-time basis in a high-speed switching method, and a single communication path structure taken between a head office and branch office(s) to thereby reduce an expense for long-distance communication. Especially, it has a distributed structure that is suitable for improving its function and expandibility as well as having a reliability.

The N number of gateway modules are constructed in a distributed module method by which each gateway module has a separated processor and a telephone service company line and interphone line connection unit and is operated independently, so that it has an expandibility and a fault tolerant against a defects.

The N/M number of packet switching modules have a structure allowing the packet switching modules to be increased in number so that the number of the interphone line can be accordingly increased as many as desired.

Taking a high-speed packet module method, the ethernet interface block includes an internal-use ethernet port for switching data including a signal and a voice between the gateway modules; and a plurality of ethernet ports being directly connected to a LAN-based independent telephone set or being connected to a hub of the LAN already installed.

To further achieve these objects and other advantages in whole or in parts, and in accordance with the purpose of the present invention, as embodied and broadly described herein, there is provided a communication system for a local area network including a private multi-media system for connecting to first and second networks, and a switching unit for coupling a plurality of terminals to the private multi-media system, wherein the first network is a public telephone network and the second network is one of a dedicated network and the internet, and wherein the private multi-media system performs a protocol conversion to couple the public telephone network to the local area network and to couple the second network to the local area network.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Figure 1:
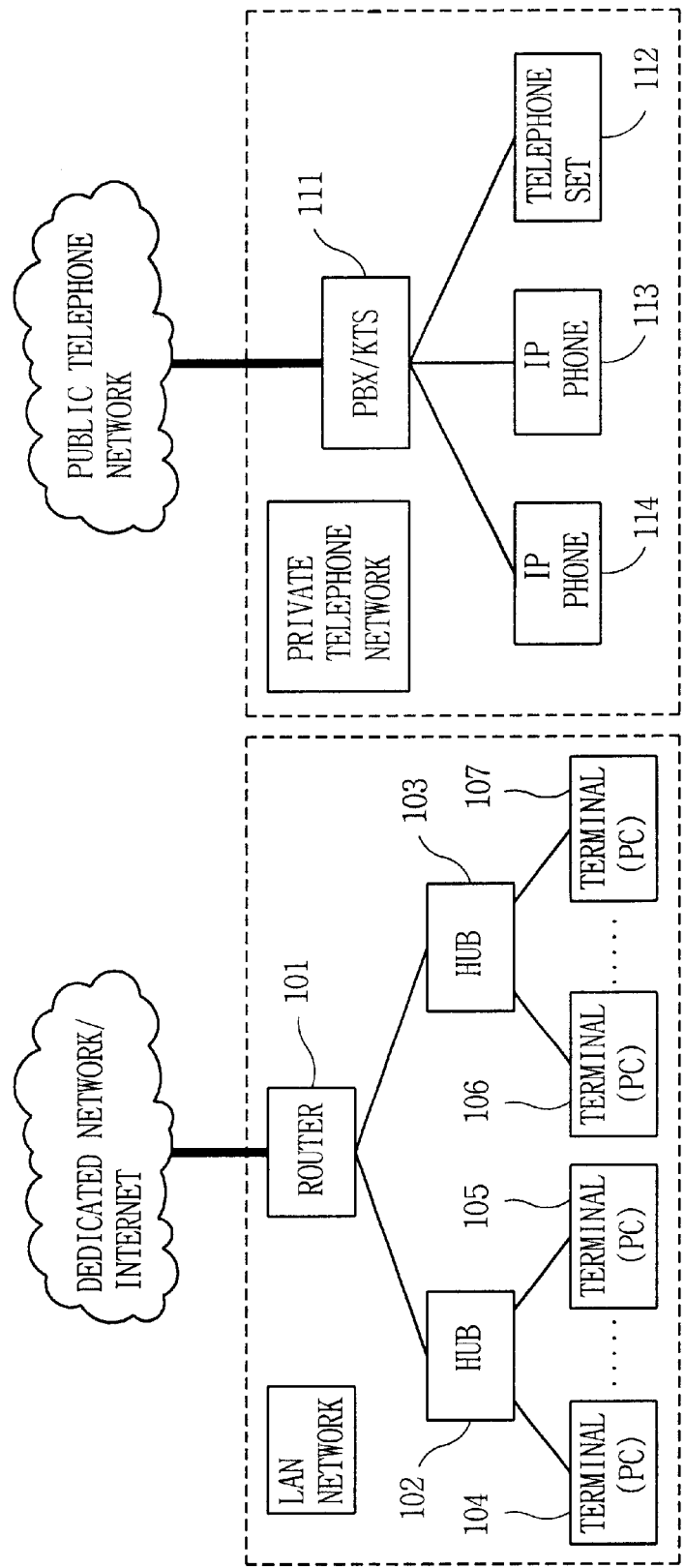
FIG. 1 is a drawing that illustrates a construction of a network in accordance with the related art.
Figure 2:
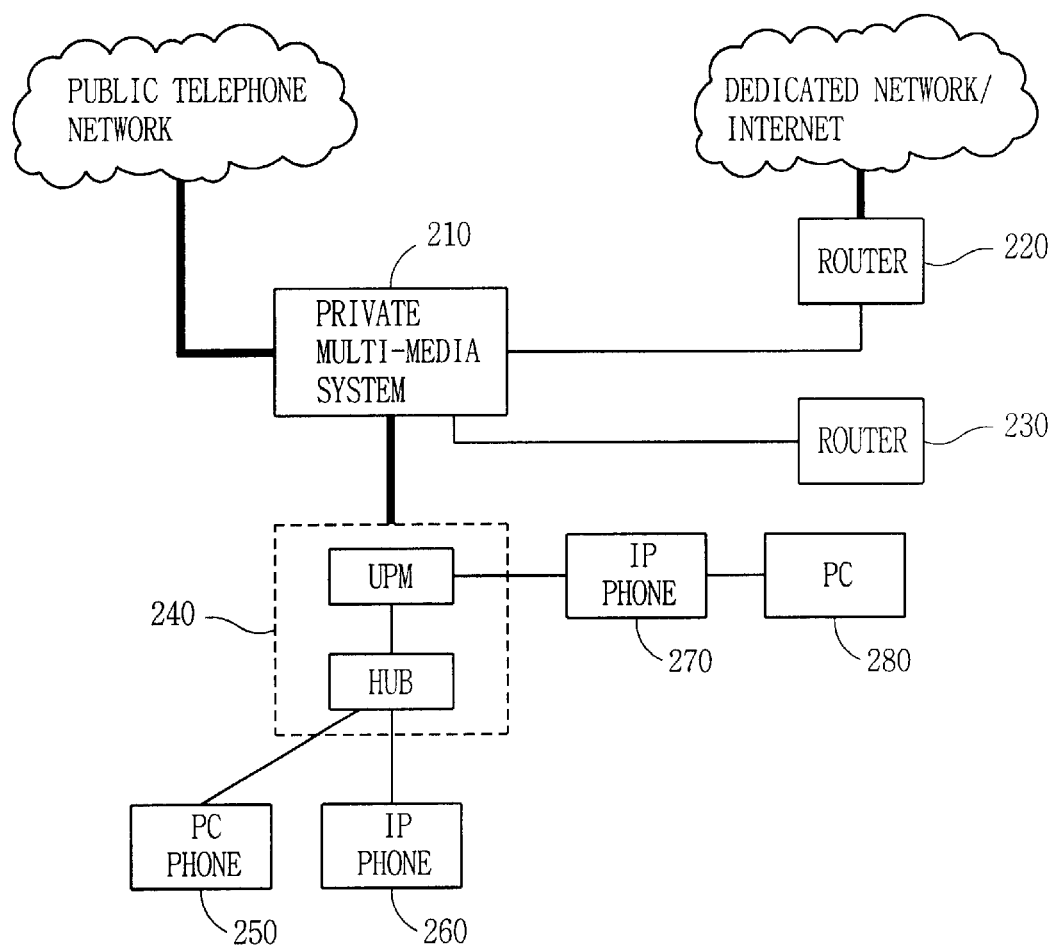
FIG. 2 is a drawing that illustrates a construction of a network in accordance with a preferred embodiment of the present invention.

Referring to FIG. 2, a network preferably includes a private multi-media system 210 for performing a protocol conversion of a quantum, so as to couple a public telephone network and the LAN. A router 220 is used to mount a function for an operating system (such as a WINDOWS NT-based system) application, for coupling to the private multimedia system and to perform data receiving and transferring with the dedicated network and/or the Internet.

A feature server 230 is preferably connected to the private multi-media system 210, in the form of a personal computer or installed as a board, and processes a call control function or other additional functions by storing an IP address and various state information. Additionally, the network includes a switching unit 240, which can include a unified power module (UPM) or a switch hub that connects a PC phone 250 and IP phones 260 and 270, both of which are terminals of LAN basis, to the private multi-media system 210. The Internet phone 270 preferably connects a personal computer or a local server 280 to the hub 240.

Figure 3:
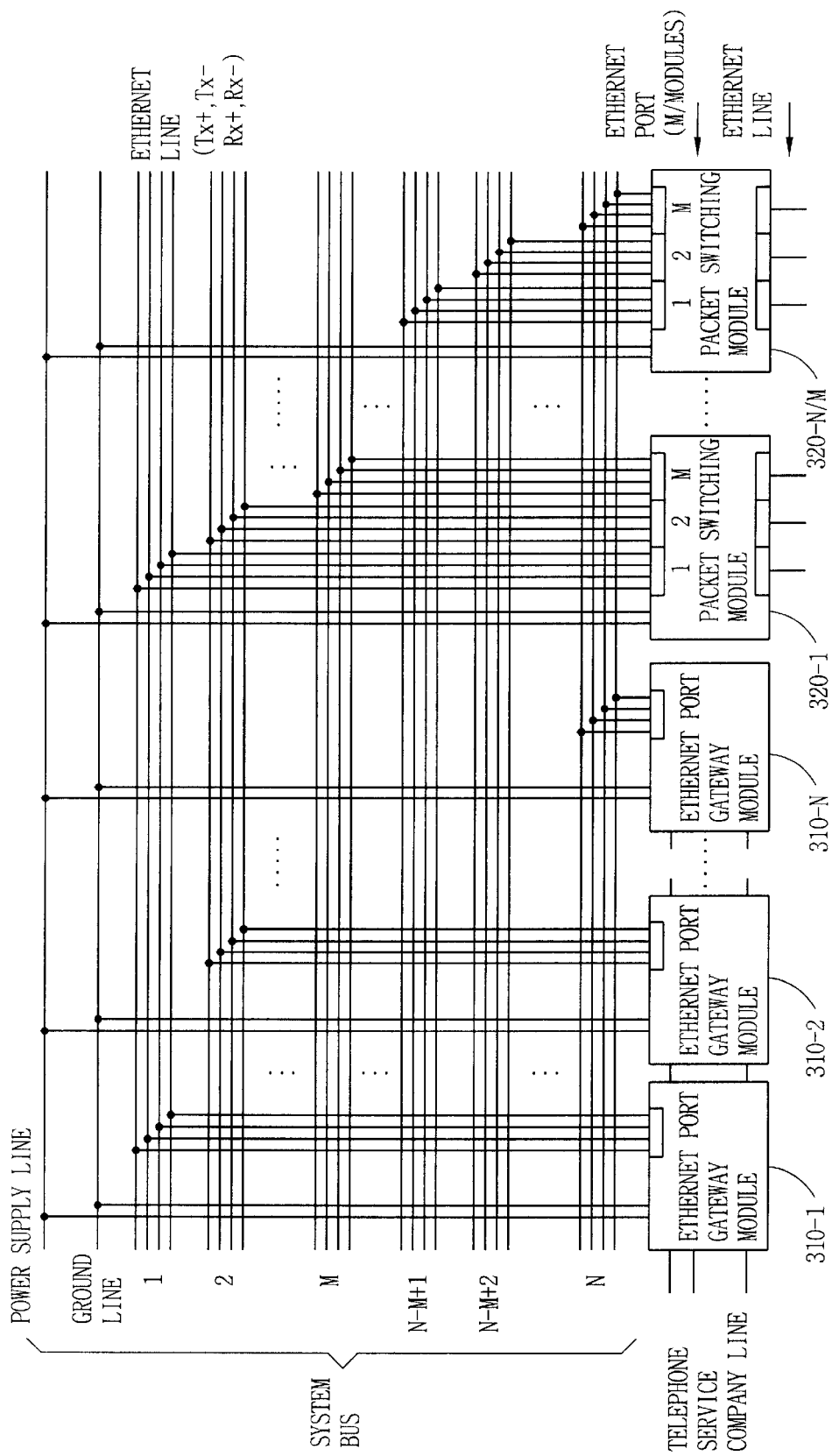
FIG. 3 is a schematic block diagram of a private multi-media system of FIG. 2.

As shown in FIG. 3, the private multi-media system 210 preferably includes N number of gateway modules 310-1~310-N for communicating with the public telephone network, and a N/M number of packet switching modules 320-1~320-N/M for communicating between the public telephone network and the LAN. The system 210 further includes an ethernet interface block implemented by the IEEE 802.3 standard, placed at a back plane for commonly connecting a N number of ports PORT1~PORTN defining four ethernet transfer lines Tx+, Tx−, Rx+ and Rx− as a single port both to the gateway modules 310-1~310-N and to the packet switching modules 320-1~320-N/M. The packet switching modules 320-1~320-N/M include a M number of ports and each port and each gateway module correspond in a one-to-one fashion.

Figure 4:
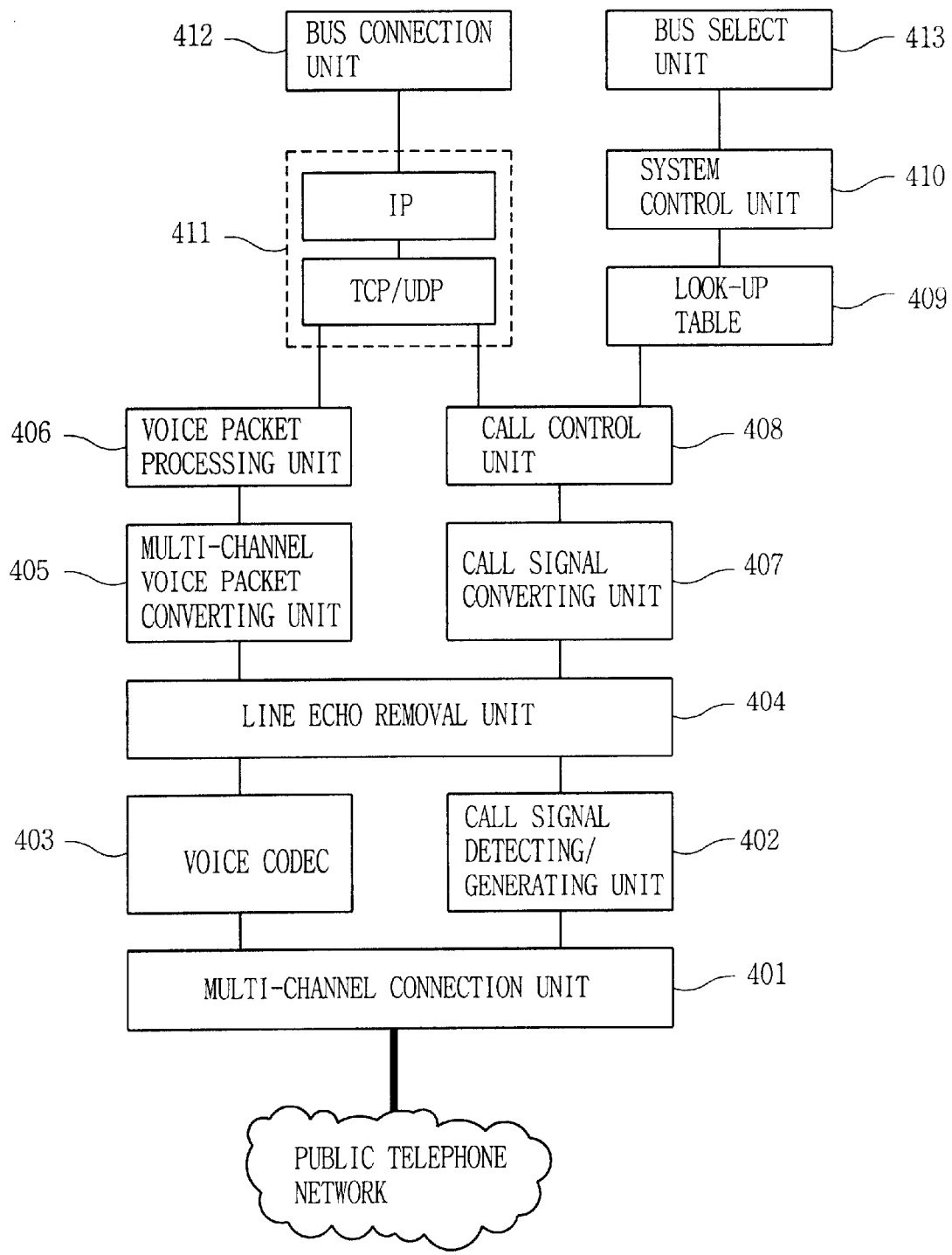
FIG. 4 is a schematic block diagram of a gateway module of FIG. 3.

As shown in FIG. 4, the gateway modules 310-1~310-N include a call signal detecting/generating unit 402 for detecting and generating ring signals of the public telephone network inputted through a multi-channel connection unit 401 and a notice signal, such as an off-hook signal, DTMF tone, or a call progress tone of interphone line. The modules further include a call signal converting unit 407, which convert ring signals to an IP address of a receiving interphone line terminal on the LAN when the ring signals are detected, and convert the ring signals to a call message form by a call control so as to transfer it to a network protocol unit 411 of a TCP/UDP and IP.

A bus connection unit 412 transfers a signal of the call signal converting unit 407 to an ethernet link of a bus at the back plane when the signal of the call signal converting unit 407 is inputted via the network protocol unit 411, and a bus select unit 413 controls the bus connection unit 412 and selects one out of the N number of ports PORT1~PORTN. A system control unit 410 renews corresponding information of a look-up table 409 upon judging that the call state was changed after checking the call signal converting unit 407.

The module preferably further includes a voice CODEC 403, which converts an analog voice transferred and received through a telephone service company line interface and through the multi-channel connection unit 401 to a G.711 PCM data form. A line echo removal unit 404 removes reflected voice signals, and a multi-channel voice packet converting unit 405 converts the voice on the telephone service company line to a real time transmission protocol/real time transmission control protocol (RTP/RTCP) packet while performing bidirectional voice transmitting and receiving with the line echo removal unit 404 under the control of the voice packet processing unit 406, and transferring it to the bus connection unit 412 via the network protocol unit 411, or converting the RTP/RTPC packet in the network protocol unit 411 to a voice fitting onto the official line and transferring it to the line echo removal unit 404.

Figure 5:
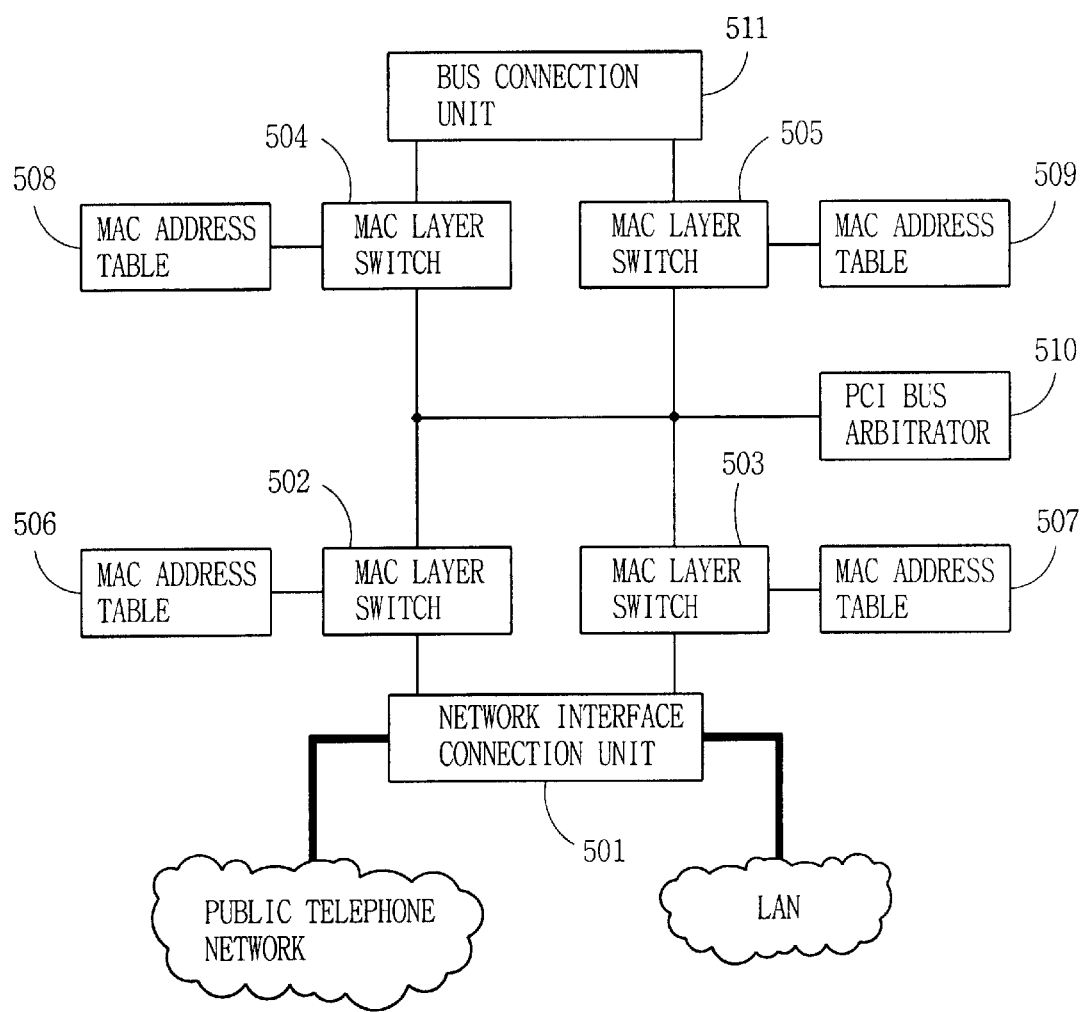
FIG. 5 is a schematic block diagram of a packet switching module of FIG. 3.

Referring to FIG. 5, the packet switching modules 320-1~320-N/M preferably include network interface connection unit 501 for interfacing with the public telephone network or with the LAN, and a bus connection unit 511 for coupling to the gateway modules 310-1~310-N. The modules 320-1~320-N/M further include a plurality of media access control (MAC) address tables 506~509 for storing MAC addresses of a destination gateway module, and a plurality of MAC layer switches 502~505 for performing communication between the network interface connection unit 501 and the bus connection unit 511 referring to the MAC addresses stored in the MAC address tables 506~509. Additionally, a personal computer interface (PCI) bus arbitrator 510 allows the MAC layer switches 502~505 to access the PCI bus.

Figure 6:
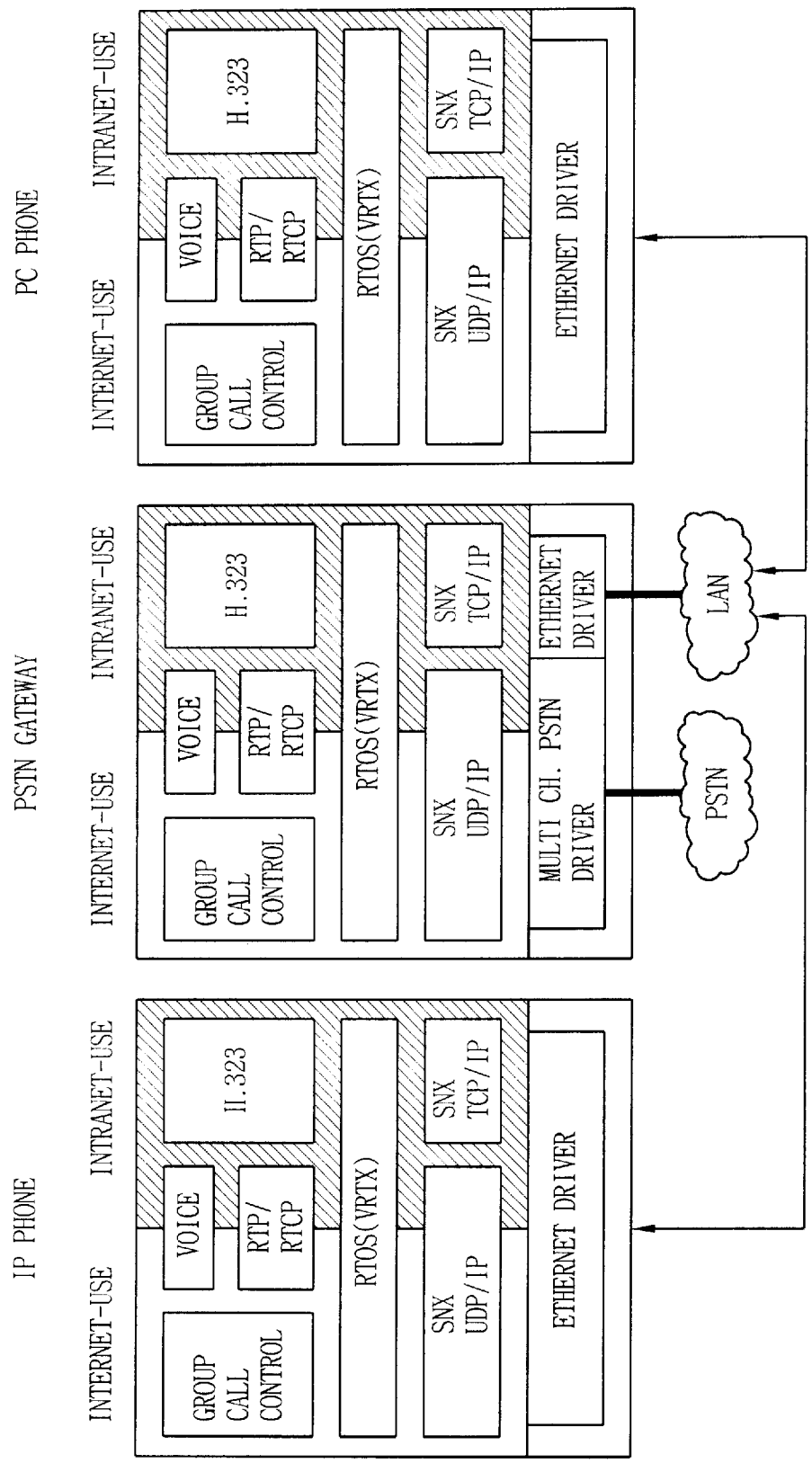
FIG. 6 is an exemplary view of a protocol structure of each module in accordance with a preferred embodiment of the present invention.

Referring to FIG. 6, as an independent terminal or a software for voice communication operated on the LAN basis, the IP phones 260 and 270 or the PC phone 250 preferably have an individual protocol that supports a group call function that co-owns telephone state information of a group holding the official line in common and a protocol structure that allows communication with other telephone sets that are on a H.323 standard. Such a protocol equivalent to the terminal protocol is supported by the gateway modules 310-1~310-N.

The operation of the voice communication apparatus and its effect in accordance with the preferred embodiment of present invention as described above will now be described. With respect to the network as shown in FIG. 2, some of the official channels of the gateway modules 310-1~310-N of FIG. 3 provided in the private multi-media system 210 are fixed for use for long-distance office of an external telephone service company line.

When there is a telephone call on an allocated number from an external source, the long-distance control function becomes active in the call signal converting unit 407 of the gateway modules 310-1~310-N, and the gateway modules 310-1~310-N control the call signal while being operated along with the call control unit 408. Subsequently, when an interphone line number is received, the gateway modules 310-1~310-N identify a corresponding IP address based on the internal look-up table 409 and then transmit a call connection signal among call messages to the packet switching modules 320-1~320-N/M through the bus connection unit 412 passing through the network protocol unit 411.

Accordingly, the packet switching modules 320-1~320-N/M switch the call connection signal to the public telephone network between the head office and the branch office (i.e., WAN) or a port allocated at the router 220 that is connected to the Internet. Thereafter, when the LAN-based voice communication terminal of the long-distance office responds, the packet switching modules 320-1~320-N/M compress the voice signal based on the G.723.1(5.3/6.3 Kbps) standard and transfer it.

If a specific number for a long-distance office is called by a LAN-based voice communication terminal that does not support the H.323 standard, the call is IP address-converted on the basis of an interphone line number followed through the call signal converting unit 407 of a specific gateway among the gateway modules 310-1~310-N, and the process is performed in the same manner of the long-distance office communication of the external telephone service company line as described above.

Accordingly, by communicating in the manner as described above, the expense for a long-distance communication can be reduced.

FIG. 6 shows an exemplary view of a protocol structure of each module, the PC phone and the Internet phones 250 and 260, the terminal for voice communication, the operations of which will now be described.

First, there are provided the independent protocol supporting a group call function that co-owns telephone state information holding a telephone service company line in common, and a protocol structure that is able to communicate with other telephone sets on the basis of the H.323 standard, based on which an operation protocol is selected by a protocol select button provided to the PC phone or the Internet phones 250 and 260.

The content selected by the PC phone 250 or the Internet phones 260 and 270 is preferably inputted to the private multi-media system 210 by the switching unit 240, which includes the hub or the UPM. The content is then transferred to the gateway modules 3101~310-N via the packet switching modules 320-1~320-N/M. Accordingly, the information packet received by the gateway modules 310-1~310-N is inputted to the network protocol unit 411 by passing through the bus connection unit 412, is processed on IP/UDP (Internet protocol/user datagram protocol), and is controlled on a group call by the control unit 408, and then is transferred to the system control unit 410.

Next, the system control unit 410 preferably analyzes the information packet and drives a protocol of a corresponding telephone service company line channel by using the protocol selected by a terminal. In this respect, since a voice communication is simultaneously supported through the telephone service company line and the multi-channel, each gateway module 310-1~310-N can be operated as an independent protocol for each channel.

More specifically, though each gateway module 310-1~310-N is coupled to the N port (POR1~PORTN) defining the four ethernet transfer line (Tx+, Tx−, Rx+ and Rx−) as a single port, forming a bus structure of [4×N(the number of the gateway module at maximum)+power supply line+ground line], each gateway module 310-1~310-N respectively activates only one port among the N number of ports PORT1~PORTN. It does so by means of the bus select unit 413, so that each gateway module activates an independent port with respect to each other, thereby having an independent band width.

Also, since the IP phones 260 and 270 receive power from the general LAN line by the UPM, they can be connected to the LAN line without any additional power supply adapter, so that communication through the telephone service company line is possible in the general telephone number method.

In addition, the packet switching modules 320-1~320-N/M include an M (number of the packet switching module) number of ports, of which each port preferably corresponds one-to-one to a specific module of the gateway modules. Thus, the MAC layer switches 502~505 switch the call message packet and a voice packet from the ethernet link constructed on the back plane of the gateway modules 310-1~310-N to a port where there is a corresponding terminal for interphone line on the basis of each MAC address table 506~509 under the control of the PCI bus arbitrator 510.

Conversely, a call signal and a voice signal from the LAN-based terminal for interphone line are processed in the reverse order and transferred to a corresponding module among the gateway modules 310-1~310-N, thereby communicating with an external general telephone set on the telephone service company line.

A description of the overall process of operations of the preferred embodiment of the present invention is as follows.

First, at an initial stage, a user inputs an IP address, an interphone line number and a group number of the Internet phones 260 and 270 and the PC phone 250 that is connected to the system. This information is then inputted to the gateway modules 310-1~310-N through the packet switching modules 320-1~320-N/M and the bus of the internal back plane. In this respect, if the terminals (250~270) are in the H.323 protocol mode, the group information is meaningless.

Next, the system controller 410 stores the information obtained during the above process in the look-up table 409. Thereafter, when the process of inputting of the information on the terminal and of assigning the number for call connection are completed, the Internet phones 260 and 270 and the PC phone 250 hold several telephone service company line numbers assigned to the same group number in common. The Internet phones 260 and 270 or the PC phone 250 then presses down a protocol select button so as to select an operation protocol.

Next, the gateway modules 310-1~310-N, related to the group number according to the terminals 250~270 and the telephone service company line number, receive the protocol information from the terminals 250~270 under the control of the system control unit 410 and drive a corresponding protocol to allow for communication with a corresponding terminal. Subsequently, a corresponding gateway module of the gateway modules 310-1~310-N, related to the group information and the terminal selected by its own protocol mode, continuously multi-casts a state variation of the terminal of its own in a packet form in the same group, whenever the state of the terminal is varied.

At this time, a corresponding gateway module related to the group information and the terminal selected by its own protocol mode analyzes the state variation packet that was multi-casted by the call control unit 408 in the same group, and displays a corresponding information on a display unit such as LED or LCD so as to inform the user thereof, and simultaneously renews the state information corresponding to each terminal stored in the look-up table 409.

Meanwhile, if the terminal 250~270 are in the H.323 protocol mode, without performing any operation for co-owning the group information, the operation of call connection to the other party, its maintaining, and its releasing are displayed on the display unit depending on the standard procedure defined at the H.323 protocol, thereby informing the user thereof. However, when communicating between its own protocol terminals, the interphone line number is simply inputted.

Communication between its own protocol terminal and an external call connected to the public telephone network is done as follows. First, when the receiver is off the hook for communication, its state information, including the content of 'busy', is given as a packet message to all of the gateway modules 310-1~310-N to which the terminal belongs. As all of the gateway modules 310-1~310-N in the same group receive the packet message, the call control unit 408 renews the state information of a corresponding terminal on the lookup table 409.

Thereafter, the packet message is inputted to the MAC layer switches 502~505 for ethernet through the ethernet LAN connection unit 510 of the packet switching modules 320-1~320-N/M. The MAC layer switches 502~505 switch the packet message to the port corresponding to the MAC address of the destination gateway module through the internal PCI bus, while referring to the MAC address tables 506~509. In this respect, the PCI bus arbitrator 510 allows the PCI bus to access to each of the MAC layer switches 502~505.

At this time, the packet message switched to the port of the back plane is received by a corresponding module of the gateway modules 310-1~310-N, and is processed based on the IP/UDP protocol by the network protocol unit 411. It is then renewed on the look-up table 409 according to the group call control function of the call control unit 408. The call control unit 408 that has performed the group call controlling drives the call signal converting unit 407, thereby occupies the telephone service company line channel.

In this respect, a dial tone or a line-busy tone is digitalized through the voice CODEC 403 according to the state of the telephone service company line, and is voice-packetized in the RTP/RTCP in the multi-channel voice packet converting unit 405 after passing through the line echo removal unit 404. The voice packet processing unit 406 buffers the voice packet in the RTP/RTCP form so as to minimize delay or packet damage, and transfers it to a corresponding port of the back plane through the network protocol unit 411 and the bus connection unit 412.

Upon receipt of the voice packet through the bus connection unit 511, the packet switching modules 320-1~320-N/M input the voice packet to the MAC layer switches 502~505 for ethernet. The MAC layer switches 502~505 then switch the voice packet to a corresponding lower port, referring to the MAC address tables 506~509 under the control of the PCI bus arbitrator 510, and transfer it to a corresponding terminal through the network interface connection unit 501.

Where the user is using the terminal to originate a call (call originating terminal), after the user hears the dial tone or the line-busy tone, he or she presses the dial button for a desired external telephone number or hangs up the receiver, as appropriate. At this time, the digit of each telephone number is inputted to the MAC layer switches 502~505 for ethernet through the network interface connection unit 501 of the packet switching modules 320-1~320-N/M. The packet switching modules 320-1~320-N/M then switch the packet message to a port corresponding to the MAC address of the corresponding gateway module through the internal PCI bus, referring to the MAC address tables 506~509. Accordingly, the call signal detecting/generating unit 402 of the corresponding gateway module generates an actual dual tone multi-frequency (DTMF) tone.

At this time, a ring back tone as received is digitalized by the voice CODEC 403 and converted to a voice packet in the RTP/RTCP by the multi-channel voice packet converting unit 405 through the line echo removal unit 404. Next, it is processed based on the UDP/IP protocol in the network protocol unit 411 by the voice packet processing unit 406, and then transferred to a corresponding terminal through a corresponding module of the packet switching modules 320-1~320-N/M via the bus connection unit 412. Accordingly, if a recipient answers the call, a caller and the recipient can communicate with each other through the communication path in which the ring-back tone was transferred. Thereafter, when the call recipient hangs up the receiver to finish the communication, the corresponding module among the gateway modules 310-1~310-N multicasts the idle state information into the group, and the communication path between the telephone service company line and the multi-channel connection unit 401 is blocked.

As so far described, the voice communication apparatus according to the preferred embodiment of the present invention has the following effects. First, each module co-owns the information by transferring the call signal and voice by the ethernet interface on a network standard. Accordingly, the switching between the public switched telephone network (PSTN) gateway modules is simply performed, thereby facilitating long-distance communication with a call recipient, such as an employee who may stay in a remote place in case of telework or telecommuting, thereby reducing an expense for the long-distance communication.

Thus, the user can be directly connected to the LAN-based voice terminal through the multi-media switch module, or indirectly connected to the LAN-based voice terminal through the general hub or the switch hub for expansion of the capacity, having an outstanding expandibility for the interphone line capacity of the system.

In addition, as having an independent rack structure, even when one module among the plurality of PSTN gateway modules is defective, the whole system is not affected due to the distributed structure. This can improve the reliability higher than that of the PC-based system.

Also, in communicating with the LAN-based voice terminal, any additional device, such as a call server, is not necessary, accomplishing operational independence and convenience in use.

Moreover, since the ethernet interface is being commonly used at a speed of 100 Mbps~1 Gbps, a higher speed can be easily realized, as compared to the conventional private voice switching system, so that multimedia service such as video switching can be easily implemented.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A communication system for a local area network (LAN), comprising:
   a private multi-media system for connecting to first and second networks;
   a switching unit for coupling a plurality of terminals to the private multi-media system, wherein the first network is a public telephone network and the second network is one of a dedicated network and the Internet, and wherein the private multi-media system performs a protocol conversion to couple the public telephone network to the LAN and to couple the second network to the LAN, and
   wherein the private multi-media system comprises:
   an ethernet interface block for commonly connecting N number of ports defining four ethernet transfer lines as a single port;
   a network interface connection unit for interfacing with the LAN and the second network;
   a bus connection unit for coupling to gateway modules;
   a plurality of media access control (MAC) address tables to store MAC addresses of a destination gateway module;
   a plurality of MAC layer switches to communicate between the network interface connection unit and the bus connection unit referring to the MAC addresses stored in the MAC address tables; and
   a personal computer interface (PCI) bus arbitrator to enable the MAC unit to access a PCI bus.

2. The system of claim 1, wherein the private multimedia system comprises:
   N number of gateway modules arranged in a distributed structure, which drive a protocol selected by a corresponding terminal in communication with a public telephone network to convert a packet and renew a state variation of a terminal allocated to itself within a group while performing the packet conversion; and
   a N/M number of packet switching modules that switches to a corresponding port while performing a communication between the plurality of gateway modules and one of a remote network and a local area network (LAN).

3. The system of claim 2, wherein the packet switching module corresponds to each of the gateway modules in a one-to-one manner.

4. The system of claim 2, wherein each of the gateway modules comprises:
   a call signal processing block to match a communication protocol between a public telephone network and an internal LAN on a real-time operating system;
   a voice processing block to process a voice packet between the public telephone network and the internal LAN when a communication path is formed;
   a multi-channel connection unit to interface between public telephone networks for the call signal processing block and the voice processing block; and
   a bus connector to interface between the call signal processing block and an ethernet interface block.

5. The system of claim 4, wherein the call signal processing block comprises:
   a call signal detecting/generating unit to detect and generate ring signals of the public telephone network inputted through the multi-channel connection unit and a notice signal;
   a call signal converting unit to convert ring signals to an IP address of a receiving interphone line terminal on the LAN side when the ring signals are detected, and to convert the ring signals to a call message form by a call control;
   a network protocol unit to process on IP/TCP/UDP protocol the signal from the call signal converting unit and the bus connector; and
   a system controller to check the call signal converting unit and renew corresponding information of a look-up table after judging that the call state was varied.

6. The system of claim 5, wherein the notice signal is one of an off-hook signal, a DTMF tone, and a call progress tone of interphone line.

7. The system of claim 4, wherein the voice processing block comprises:
   a voice CODEC to convert an analog voice transferred and received through a telephone service company line interface through the multi-channel connection unit to a prescribed data form;

a line echo removal unit to remove a reflected voice signal from the converted signal;

a multi-channel voice packet converting unit to convert the analog voice signal on the telephone service company line passing through the line echo removal unit to an RTP/RTCP packet, and convert the RTP/RTCP packet on the LAN to an analog voice fitting onto the telephone service company line, to couple it to the line echo removal unit; and a voice packet processing unit to connect the multi-channel voice packet converting unit to a network protocol unit.

8. The system of claim 7, wherein the prescribed data form is G.711 PCM.

9. The system of claim 4, wherein the bus connector comprises:

a bus connection unit to connect the network protocol unit and an ethernet link of the ethernet interface block; and a bus selecting unit to control the bus connection unit so as to select one out of N number of ports.

10. The system of claim 2, wherein the remote network is a public telephone network.

11. The system of claim 2, further comprising:

a port to connect a prescribed number of ethernet transfer lines; and a power supply line and a ground line, commonly connected to the plurality of gateway modules and the packet switching module.

12. The system of claim 1, wherein the switching unit comprises:

a unified power module (UPM); and a hub coupled to the UPM, wherein the hub is coupled to at least one communication terminal, and wherein the UPM is coupled to the private multi-media system.

13. The system of claim 12, wherein the UPM is directly coupled to at least one communication terminal, and wherein each communication terminal is one of a PC phone and an IP phone.

14. The system of claim 1, wherein the private multi-media system comprises:

N number of gateway modules coupled to the first network;

a N/M number of packet switching modules coupled to the second network and the plurality of the gateway modules, wherein each of the gateway modules comprises, a call signal processing block to match a communication protocol between the public telephone network and the LAN on a real-time operating system, a voice processing block to process a voice packet between the public telephone network and the LAN when a communication path is formed, a multi-channel connection unit to interface between public telephone networks for the call signal processing block and the voice processing block, and a bus connector to interface between the call signal processing block and an ethernet interface block.

15. A communications system comprising:

a multi-media system to couple to first and second networks;

a switching unit to couple a plurality of terminals to the multi-media system, wherein the multi-media system comprising:

N number of gateway modules to couple to the first network;

a N/M number of packet switching modules to couple to the second network and the plurality of the gateway modules; and an ethernet interface block for commonly connecting N number of ports defining four ethernet transfer lines as a single port both to the gateway modules and to the packet switching modules, wherein the packet switching module comprises:

a network interface connection unit to interface with one of a remote network and a (local area network) LAN;

a bus connection unit to couple with at least one gateway module;

a media access control (MAC) unit to communicatively couple the network interface connection unit to the bus connection unit; and a personal computer interface (PCI) bus arbitrator to enable the MAC unit to access a PCI bus.

16. The system of claim 15, wherein the gateway module is configured to communicate with a public telephone network, and wherein the MAC unit comprises:

a plurality of MAC address tables to store MAC addresses of a prescribed gateway module; and a plurality of MAC layer switches to communicate between the network interface connection unit and the bus connection unit referring to the MAC addresses stored in the MAC address tables.

17. The system of claim 16, wherein the packet switching module and the gateway module are configured to match protocols to enable voice communication between the public telephone network and the LAN.

18. A communications system comprising:

a multi-media system to couple to first and second networks;

a switching unit to couple a plurality of terminals to the multi-media system, wherein the multi-media system comprises:

N number of gateway modules to couple to the first network;

a N/M number of packet switching modules to couple to the second network and the plurality of the gateway modules; and an ethernet interface block for commonly connecting N number of ports defining four ethernet transfer lines as a single port both to the gateway modules and to the packet switching modules, wherein each of the gateway modules comprising:

a call signal processing block to match a communication protocol between a public telephone network and a local area network (LAN) on a real-time operating system;

a voice processing block to process a voice packet between the public telephone network and the LAN when a communication path is formed;

a multi-channel connection unit to interface between the public telephone network for the call signal processing block and the voice processing block; and a bus connector to interface between the call signal processing block and the ethernet interface block;

wherein the packet switching module comprises:

a network interface connection unit to interface with one of a remote network and a (local area network) LAN;

a bus connection unit to couple with at least one gateway module;

a media access control (MAC) unit to communicatively couple the network interface connection unit to the bus connection unit; and a personal computer interface (PCI) bus arbitrator to enable the MAC unit to access a PCI bus.

19. The system of claim 18, wherein the call signal processing block comprises:

a call signal detecting/generating unit to detect and generate ring signals of the public telephone network, inputted through a multi-channel connection unit, and a notice signal;

a call signal converting unit to convert ring signals to an IP address of a receiving interphone line terminal on the LAN when the ring signals are detected, and to convert the ring signals to a call message form by a call control;

a network protocol unit to protocol process signals from the call signal converting unit and the bus connector; and a system controller to check the call signal converting unit and renew corresponding information of a look-up table after determining that a call state was varied.

20. The system of claim 19, wherein the notice signal is one of an off-hook signal, a DTMF tone, and a call progress tone of an interphone line.

21. The system of claim 18, wherein the voice processing block comprises:

a voice CODEC to convert an analog voice signal transferred and received through a telephone service company line interface through the multi-channel connection unit to a prescribed data form;

a line echo removal unit to remove a reflected voice signal from the converted signal;

a multi-channel voice packet converting unit to convert the analog voice signal on the telephone service company line passing through the line echo removal unit to an RTP/RTCP packet, and convert the RTP/RTCP packet on the LAN network to an analog voice signal fitting onto the telephone service company line, to couple it to the line echo removal unit; and a voice packet processing unit to couple the multi-channel voice packet converting unit to a network protocol unit.

22. The system of claim 21, wherein the prescribed data form is G.711 PCM.

23. The system of claim 18, wherein the bus connector comprises:

a bus connection unit to connect the network protocol unit and an ethernet link of the ethernet interface block; and a bus selecting unit to control the bus connection unit so as to select one out of N number of ports.

\* \* \* \* \*